United States Patent [19]

Small

[11] Patent Number: 5,120,951
[45] Date of Patent: Jun. 9, 1992

[54] OPTOELECTRONIC MOTION AND FLUID FLOW SENSOR WITH RESILIENT MEMBER DEFLECTED BY FLUID FLOW

[75] Inventor: James G. Small, Westlake Village, Calif.

[73] Assignee: Hughes Aircraft Company, Los Angeles, Calif.

[21] Appl. No.: 564,006

[22] Filed: Aug. 7, 1990

[51] Int. Cl.⁵ .............................................. H01J 5/16
[52] U.S. Cl. ........................... 250/227.21; 250/231.10; 73/516 LM; 73/517 A; 73/861.71
[58] Field of Search .................. 250/227.14, 231.10, 250/227.21; 73/515, 516 LM, 517 A, 505, 861.71, 861.74, 861.24

[56] References Cited

U.S. PATENT DOCUMENTS

| | | |
|---|---|---|
| 3,224,279 | 12/1965 | Galli et al. ............. 250/227.14 |
| 3,940,609 | 2/1976 | Johnstun . |
| 4,307,618 | 12/1981 | James et al. ............. 73/861.74 |
| 4,376,390 | 3/1983 | Rines ............. 73/517 A |
| 4,419,895 | 12/1983 | Fuller ............. 73/517 A |
| 4,472,022 | 9/1984 | Bearcroft et al. ............. 73/861.24 |
| 4,593,555 | 6/1986 | Krutz et al. . |
| 4,679,029 | 7/1987 | Krohn et al. ............. 250/231.1 |
| 4,718,276 | 1/1988 | Laughlin . |

FOREIGN PATENT DOCUMENTS 211680  7/1983  United Kingdom ............. 73/861.24

OTHER PUBLICATIONS

A Versatile Wide Dynamic Range MHD Angular Sensor, M. Hawes, et al., Applied Technology Associates, Inc.

*Primary Examiner*—David C. Nelms
*Assistant Examiner*—John R. Lee
*Attorney, Agent, or Firm*—V. D. Duraiswamy; W. K. Denson-Low

[57] ABSTRACT

A sensor includes a light source (24) and photosensor (28) which are disposed on opposite sides of a fluid flow passageway. A resilient member is fixedly supported at one end or edge and entrained in the fluid (14) for varying the amount of light incident on the photosensor (28) from the light source (24) as a function of the amount of deflection of the resilient member caused by motion of the fluid (14) in the passageway. The resilient member may be an optical fiber (18) which transmits light from the light source (24) toward the photosensor (28). Alternatively, the resilient member may be a curtain (62) which variably blocks propagation of light from the light source (24) to the photosensor (28). The passageway may be defined by a container (12) which is filled with the fluid (14), and the sensor constructed to sense rotational or linear motion of the container (12) relative to the fluid (14). In this case, the fluid resists movement due to stationary inertia, thereby causing relative deflection of the entrained resilient member. Alternatively, the passageway may be maintained stationary, and a fluid directed to flow therethrough which causes deflection of the resilient member and enables measurement of the rate of fluid flow through the passageway.

31 Claims, 6 Drawing Sheets

OPTOELECTRONIC MOTION AND FLUID FLOW SENSOR WITH RESILIENT MEMBER DEFLECTED BY FLUID FLOW

BACKGROUND OF THE INVENTION

1. Field of the Invention

The present invention relates to an optoelectronic sensor which is capable of measuring rotational and/or linear motion, as well as the rate of flow of a fluid.

2. Description of the Related Art

Rotation or yaw rate sensors are desirable for advanced mechanical control systems such as active-suspension and anti-skid braking systems for automotive vehicles. Known rotation sensors such as mechanical gyroscopes, ring lasers, fiber-optic ring interferometers, and variations of liquid-suspended floating rotors are far too expensive for automotive applications.

Another type of sensor manufactured by Applied Technology Associates, Inc., of Albuquerque, NM senses the fluid motion of liquid mercury in a magnetic field. The sensor is described in a data sheet distributed by said manufacturer entitled "A VERSATILE WIDE DYNAMIC RANGE MHD ANGULAR SENSOR", by M. Hawes et al. Shearing motions of the conducting mercury relative to the magnetic field result in a magnetohydrodynamic (MHD) voltage.

The principal disadvantage of the MHD sensor is that the signal voltages are very small, typically on the order of one microvolt, for rotations of interest to automotive applications. Low signal levels and resulting poor signal to noise ratios require expensive low noise amplifiers and signal conditioning circuitry, which preclude the application of MHD sensors to automotive systems which require low cost components.

SUMMARY OF THE INVENTION

The present invention provides a low cost sensor which is capable of measuring rotational and linear motion. It makes use of the motion of a low viscosity fluid, such as water, in a smooth-walled container. When the container rotates, the fluid shears relative to the walls of the container. The semi-circular canals of the human inner ear sense rotations of the head by means of fluid motion. In mammals, the fluid motion is detected by small hair-like fibers which project into the fluid and are deflected by the fluid motion. The deflections are sensed by nerves in the hairs. In the present invention, deflection of optical fibers or other resilient members by relative fluid flow is detected optoelectronically rather than physiologically.

In accordance with the present invention, a sensor includes a light source and photosensor which are disposed on opposite sides of a fluid flow passageway. A resilient member is fixedly supported at one end or edge and entrained in the fluid for varying the amount of light incident on the photosensor from the light source as a function of the amount of deflection of the resilient member caused by motion of the fluid in the passageway. The resilient member may be an optical fiber which transmits light from the light source toward the photosensor. Alternatively, the resilient member may be a curtain which variably blocks propagation of light from the light source to the photosensor. The passageway means may be a container which is filled with the fluid, and the sensor constructed to sense rotational or linear motion of the container relative to the fluid. In this case, the fluid resists movement due to inertia, thereby causing relative deflection of the entrained resilient member. Alternatively, the passageway may be maintained stationary, and a fluid directed to flow therethrough which causes deflection of the resilient member and enables measurement of the rate of fluid flow through the passageway.

The present sensor is rugged and can be manufactured at very low cost on a commercial production basis. The light source may be a light emitting diode bonded to an optical fiber. The other electronic components are inexpensive and readily available. The electrical output signals are large, on the order of one volt, and have high signal-to-noise ratios. Where the sensor is designed to measure only rotational motion, an electronic differencing circuit may be provided to cancel signals produced by linear motion, and vice-versa. Alternatively, the sensor can be designed to detect rotational and linear motion simultaneously.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
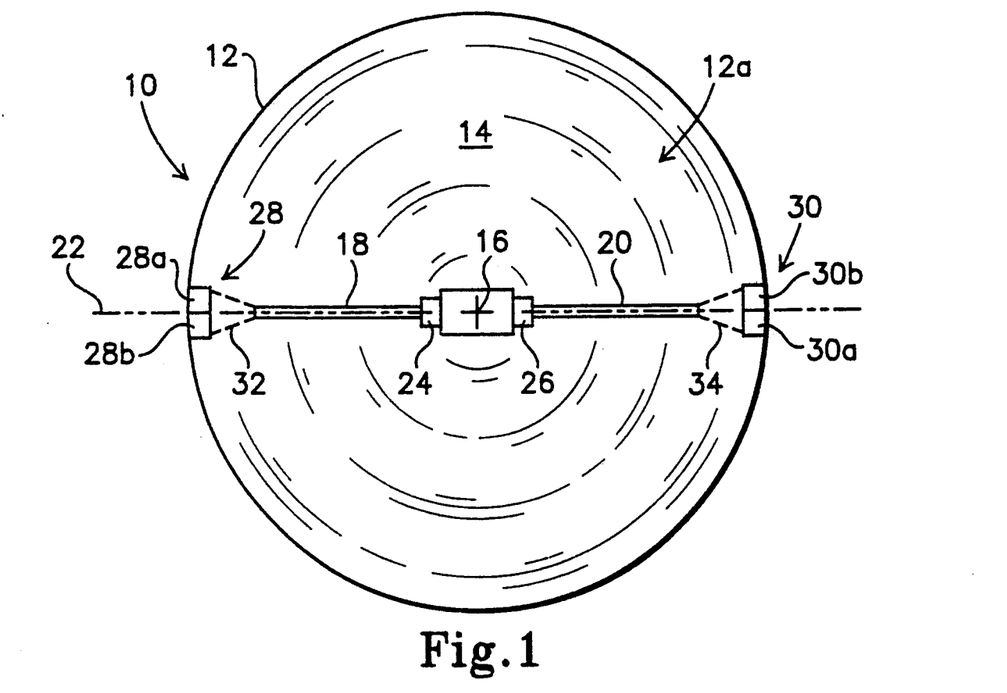
FIGS. 1 to 3 are simplified plan views of a first embodiment of a motion sensor according to the present invention utilizing optical fibers as sensing elements in a stationary position, subjected to rotational motion, and subjected to linear motion respectively.

Referring now to FIG. 1 of the drawing, a sensor embodying the present invention is generally designated as 10, and includes a cylindrical container 12 which defines therein a fluid passageway 12a filled with a low viscosity fluid 14 such as water. The container 12 has a central axis designated by a cross 16 which extends perpendicular to the plane of the drawing.

In accordance with the present invention, resilient optical fibers 18 and 20 extend on opposite sides of the axis 16 along a diametric axis or line 22 which is perpendicular to the axis 16 when the container 12 and fluid 14 are stationary. The line 22 also defines a plane (not designated) which passes therethrough, and extends parallel to the axis 16 (perpendicular to the plane of the drawing). The optical fibers 18 and 20 are immersed in, and preferably entrained in the fluid 14.

Light sources 24 and 26 which may preferably be embodied as light emitting diodes are fixedly mounted adjacent to the radially inner ends of the optical fibers 18 and 20 for emitting light thereinto respectively. The optical fibers 18 and 20 are fixed at their radially inner ends and thereby supported in a cantilever manner, with their radially outer ends free to be deflected by movement of the fluid 14 in the passageway 12a.

A photosensor 28 which includes photosensor elements 28a and 28b such as photodiodes, phototransistors, photovoltaic cells, or the like is fixedly mounted on the left side of the container 12 in alignment with the line 22. More specifically, the photosensor elements 28a and 28b are disposed on opposite sides of the line 22, with the element 28a being located clockwise from the element 28b about the axis 16. A similar photosensor 30 including photosensor elements 30a and 30b is fixedly mounted on the right side of the container 12 in alignment with the line 22.

FIG. 1 illustrates the state of the sensor 10 with the container 12 and fluid 14 stationary. Light from the light source 24 is transmitted radially outwardly through the optical fiber 18 and propagates from the radially outer end of the optical fiber 18 through the fluid 14 to the photosensor 28 in the form of an expanding cone of light 32. Since the light source 24, optical fiber 18, and photosensor 28 are in mutual alignment along the line 22, the amounts of light incident on the photosensor elements 28a and 28b are equal. Thus, the elements 28a and 28b produce equal electrical output signals. The same is true for the photosensor elements 30a and 30b, with the respective light cone being designated as 34.

Figure 2:
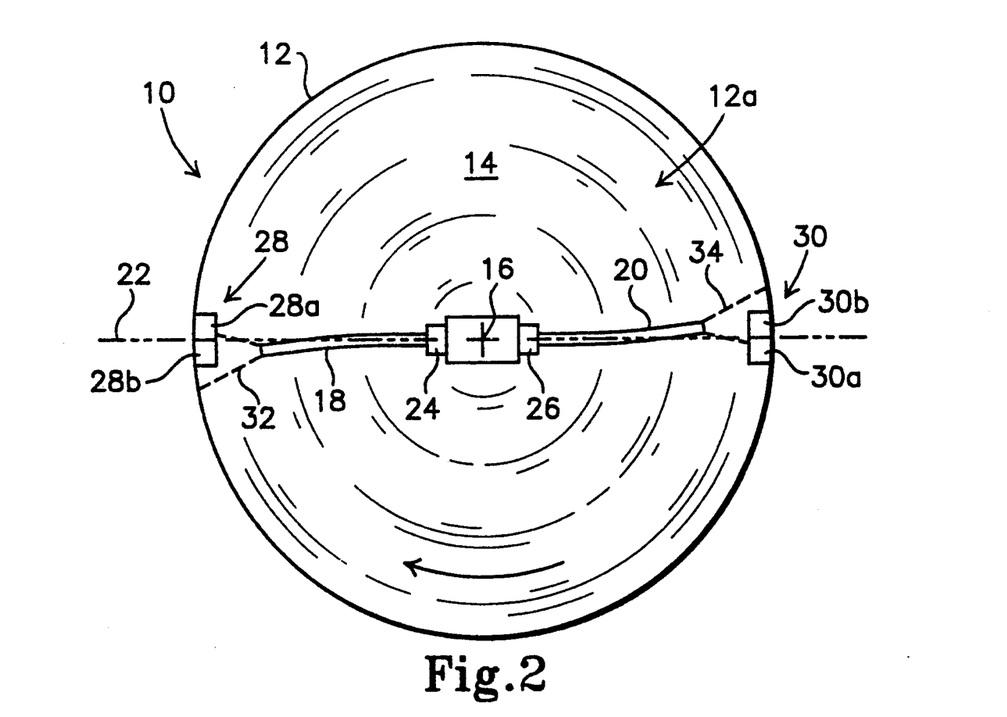

FIG. 2 illustrates the case where the container 12 is rotated clockwise about the axis 16. The fluid 14 resists movement due to stationary inertia. However, viscous coupling between the inner wall of the container 12 and the fluid 14 creates a shear gradient in the fluid 14 which decreases toward the axis 16. The container 12 and photosensors 28 and 30 thereby move clockwise relative to the radially outer ends of the optical fibers 18 and 20 respectively. It will be noted that the effect is equivalent if the container 12 is held stationary and the fluid 14 caused to flow counterclockwise through the passageway 12a.

As viewed in FIG. 2, the light cones 32 and 34 are shifted counterclockwise such that more light is incident on the photosensor elements 28b and 30b than on the elements 28a and 30a. As will be described below, the elements 28a and 28b, and the elements 30a and 30b are preferably connected in a differential circuit arrangement such that the photosensor elements 28 and 30 produce a positive output signal when the elements 28b and 30b are illuminated more than the elements 28a and 30a (container 12 rotated clockwise), and a negative output signal when the opposite occurs. The deflection of the optical fibers 18 and 20 by the fluid 14 and thereby the magnitude of the output signals from the photosensors 28 and 30 is proportional to the angular rotational speed of the container 12, and may be made highly linear using even low cost electrical components.

Figure 3:
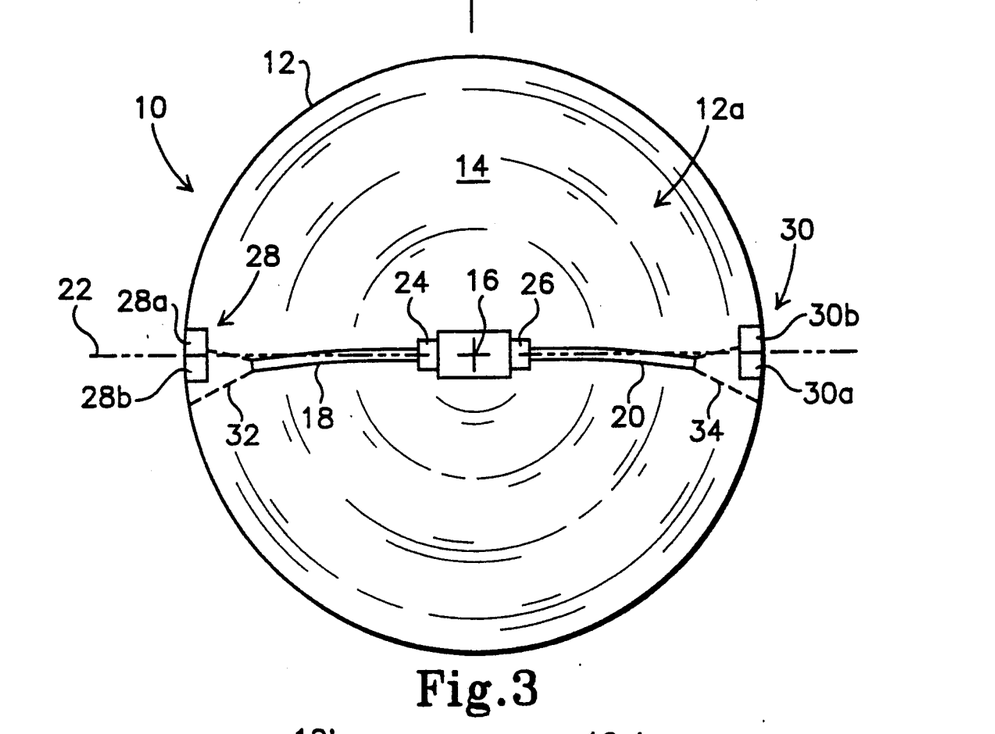

The sensor 10 is also capable of detecting linear motion perpendicular to the line 22, and/or producing an output signal which is proportional to rotational and/or linear motion with the effect of the other type of motion removed. As shown in FIG. 3, linear acceleration of the container 12 in the upward direction will cause both optical fibers 28 and 30 to be deflected below the line 22. When the optical fiber has a density differing from the fluid, linear acceleration (including gravity) produces buoyant forces which deflect the fiber. Thus, the photosensor 28 will produce a positive output, whereas the photosensor 30 will produce a negative output. The opposite will occur for movement of the container 12 in the downward direction. Thus, the present sensor 10 is capable of detecting both the direction and magnitude of rotational and translational motion.

Figure 4:
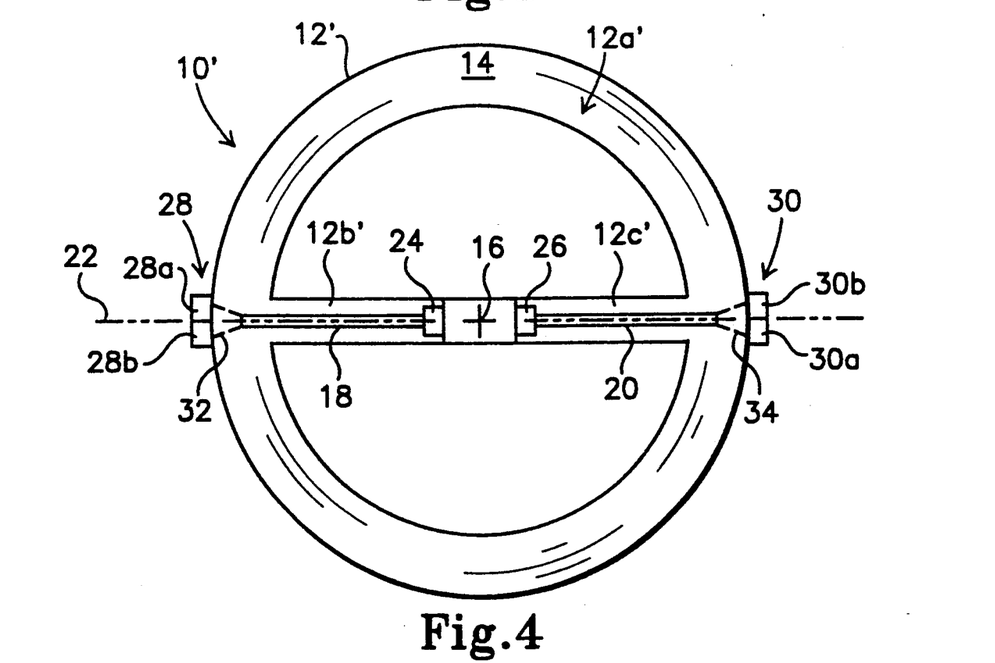
FIG. 4 is a simplified plan view illustrating a modification of the sensor illustrated in FIGS. 1 to 3.

FIG. 4 illustrates a modification of the sensor 10, with like elements designated by the same reference numerals and corresponding but modified elements designated by the same reference numerals primed. In a sensor 10', a container 12' is modified to define a fluid passageway 12a' having a narrow torroidal shape. The major portions of the optical fibers 18 and 20 are disposed in inner radial extensions 12b' and 12c' of the passageway 12a, with only the radially outer ends of the fibers 18 and 20 protruding into the main torroidal passageway 12a'. The configuration of the sensor 10' enables relatively long optical fibers to be used, and reduces the response of the sensor 10' to rotation about axes other than the axis 16.

Figure 5:
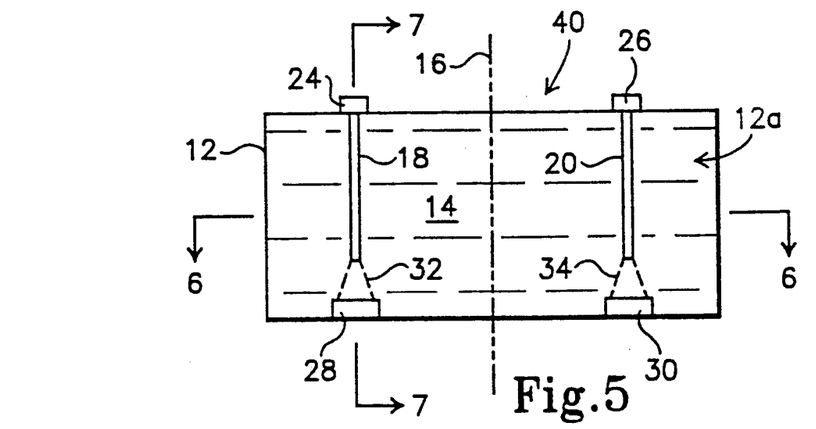
FIG. 5 is a vertical sectional view of another motion sensor embodying the invention.
Figure 6:
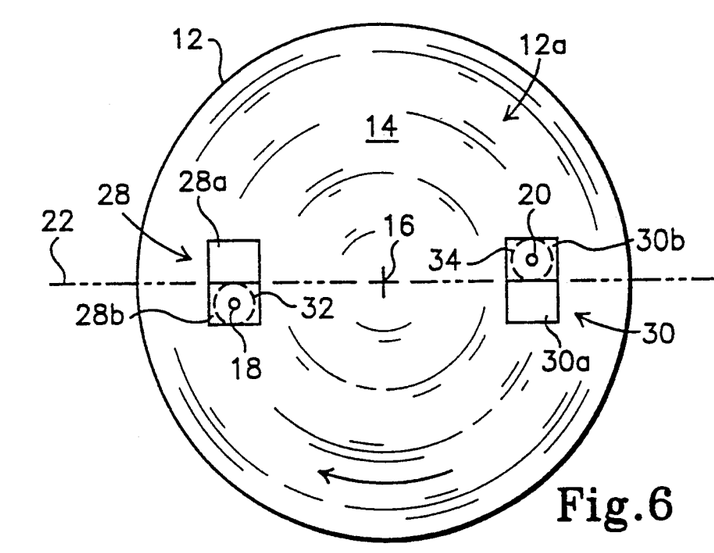
FIG. 6 is a sectional view taken on a line 6—6 of FIG. 5.
Figure 7:
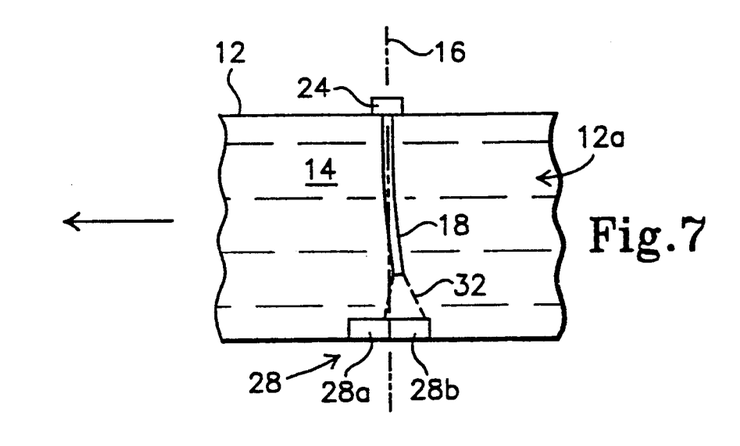
FIG. 7 is a fragmentary sectional view taken on a line 7—7 of FIG. 5.

In the embodiments of FIGS. 1 to 4, the optical fibers 18 and 20 are oriented horizontally and extend perpendicular to the axis 16. FIGS. 5 to 7 illustrate another sensor 40 embodying the present invention in which the optical fibers 18 and 20 are oriented vertically, extend parallel to, and are offset from the axis 16. Rotation or linear motion of the container 12 causes deflection of the free end portions of the vertically oriented optical fibers of FIGS. 5 to 7 in a manner which is essentially similar to that described with reference to horizontally oriented optical fibers illustrated in FIGS. 1 to 4. The horizontal and vertical orientations of the optical fibers 18 and 20 are common in that rotational or translational motion of the container 12 will cause the free ends of the fibers 18 and 20 to deflect relative to the photosensors 28 and 30 in a direction substantially perpendicular to the line 22, and thereby perpendicular to the vertical plane described above which passes through the line 22.

As illustrated in FIGS. 5 to 7, clockwise rotation of the container 12 causes the photosensors 28 and 30 to move clockwise relative to the free ends of the optical fibers 18 and 20, whereby the photosensors 28 and 30 produce positive output signals in the same manner as described with reference to FIGS. 1 to 4. It will be noted that equivalent results may be obtained if the optical fibers 18 and 20 are supported at their lower ends, rather than at their upper ends as illustrated, the light sources 24 and 26 disposed adjacent to the lower ends of the optical fibers 18 and 20, and the photosensors 28 and 30 disposed adjacent to the free upper ends of the optical fibers 18 and 20 respectively.

Figure 8:
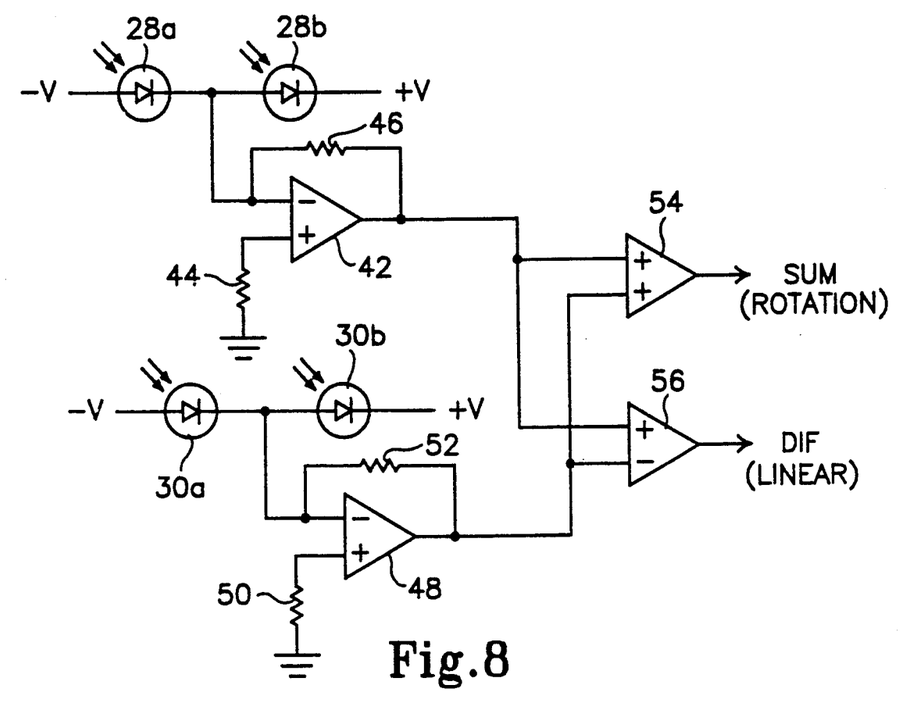
FIG. 8 is an electrical schematic diagram illustrating photosensing and signal processing circuitry according to the invention.

FIG. 8 illustrates an electronic circuit arrangement which is applicable to all of the sensor arrangements described above, and is capable of producing separate output signals corresponding to rotational motion of the sensor about the central axis 16 and linear motion of the sensor perpendicular to the line 22. The photosensor elements 28a, 28b, 30a and 30b are embodied as photodiodes, with the anode of the element 28a connected to a negative power source voltage −V and the cathode of the element 28b connected to a positive power source +V. The cathode of the element 28a is connected to the anode of the element 28b. The junction of the elements 28a and 28b constitutes a difference signal output thereof, and is connected to the inverting input of an operational amplifier 42. The non-inverting input of the amplifier 42 is connected to ground through a resistor 44. A feedback resistor 46 is connected between the output and inverting input of the amplifier 42. The elements 30a and 30b are connected in an essentially similar arrangement to an operational amplifier 48, utilizing resistors 50 and 52. The outputs of the operational amplifiers 42 and 48 are connected to inputs of an adder 54 and a subtractor 56.

As described above, clockwise rotation of the container 12 causes more light to be incident on the elements 28b and 30b than on the elements 28a and 30a. This causes the photocurrent of the elements 28b and 30b to increase relative to the photocurrent of the elements 28a and 30a, and the current at the junctions thereof to increase. The output voltages of the operational amplifiers 42 and 48 thereby decrease to maintain balance in the negative feedback circuit. This circuit is often referred to as a trans-impedance amplifier or a current to voltage converter.

The positive output voltages of the amplifiers 42 and 48 are added together by the adder 54 to produce an output voltage (assuming a scale factor of unity) which is twice the output of each of the individual amplifiers 42 and 48. The positive output voltages of the amplifiers 42 and 48 are subtracted from each other by the subtractor 56, which produces an output voltage of zero. For counterclockwise rotation of the container 12, the adder 54 will produce a negative output voltage, and the subtractor 56 will produce a zero output voltage.

If the container 12 is accelerated upwardly as illustrated in FIG. 3, the amplifier 42 will produce a positive output voltage whereas the amplifier 48 will produce a negative output voltage of the same magnitude. Thus, the adder 54 will produce a zero output voltage. However, the negative output voltage of the amplifier 48 is subtracted from the positive output voltage of the amplifier 42, whereby the subtractor 56 produces a positive output voltage having a magnitude equal to twice the magnitude of the individual output voltages of the amplifiers 42 and 48. If the container 12 is accelerated downwardly, the adder 54 will produce a zero output voltage, and the subtractor 56 will produce a negative output voltage.

It will be seen that adding the output voltages of the amplifiers 42 and 48 cancels the effects of linear acceleration of the container 12, and produces an output which corresponds only to rotation of the container 12 about the axis 16. Similarly, subtracting the output voltages of the amplifiers 42 and 48 cancels the effects of rotational motion of the container 12, and produces an output which corresponds only to linear acceleration of the container 12 perpendicular to the line 22.

In accordance with the particular application of the invention, the subtractor 56 may be omitted if only rotational motion is required to be sensed, and the adder 54 may be omitted if only linear movement is required to be sensed. Further, although two optical fibers and associated light sources and photosensors are desirable since this arrangement enables the effects of linear motion to be eliminated from the measurement of rotational motion and vice-versa, it is within the scope of the invention to provide the present sensor as including only one optical fiber and associated light source and photosensor where the de-coupling of rotational and linear motion is not required. In addition, three or more optical fibers may be provided in accordance with a particular application.

The circuit arrangement of FIG. 8 is highly advantageous in that the voltage difference between the two elements of each photosensor is taken before the photosensor output is applied to the respective amplifier. This enables the amplifiers to operate with an extremely high signal to noise ratio, and large dynamic range.

Figure 9:
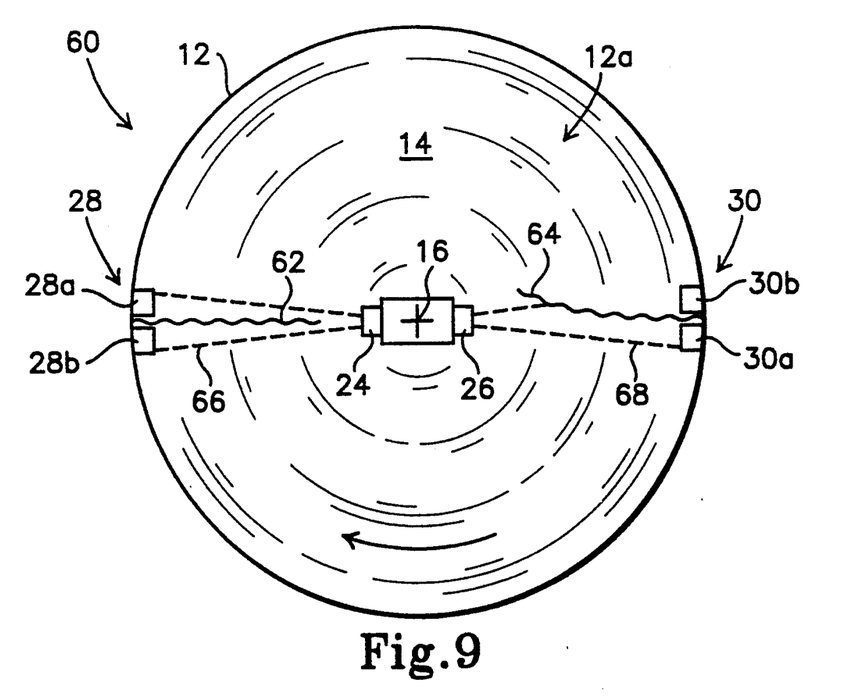
FIGS. 9 and 10 are simplified plan views illustrating alternative embodiments of the present sensor utilizing resilient curtains as sensing elements.

FIG. 9 illustrates another sensor 60 embodying the present invention in which the optical fibers 18 and 20 are replaced by resilient curtains 62 and 64 respectively made of a material which is at least partially opaque. In accordance with the present disclosure, the term "curtain" is used to describe any opaque or semi-opaque resilient member which is capable of casting a shadow or at least partially blocking light. As shown, the curtains 62 and 64 are fixedly supported at their radially outer edges between the photosensor elements 28a,28b, and 30a,30b respectively. FIG. 9 is a composite diagram illustrating the curtain 62 in an undeflected state in which the container 12 and fluid 14 are assumed to be stationary, and the curtain 64 in a deflected state resulting from clockwise rotation of the container 12.

Cones of light emitted by the light sources 24 and 26 are designated as 66 and 68 respectively. The curtain 62 blocks equal amounts of light on each of the photosensor elements 28a and 28b, and the photosensor 28 produces a zero output signal. The deflected curtain 64, however, is shown as blocking or casting a shadow of a larger part of the light incident on the photosensor element 30b. The element 30a will receive more light than the element 30b, and thereby the output of the photosensor 30 will be negative. The result is opposite for counterclockwise rotation of the container 12.

Figure 10:
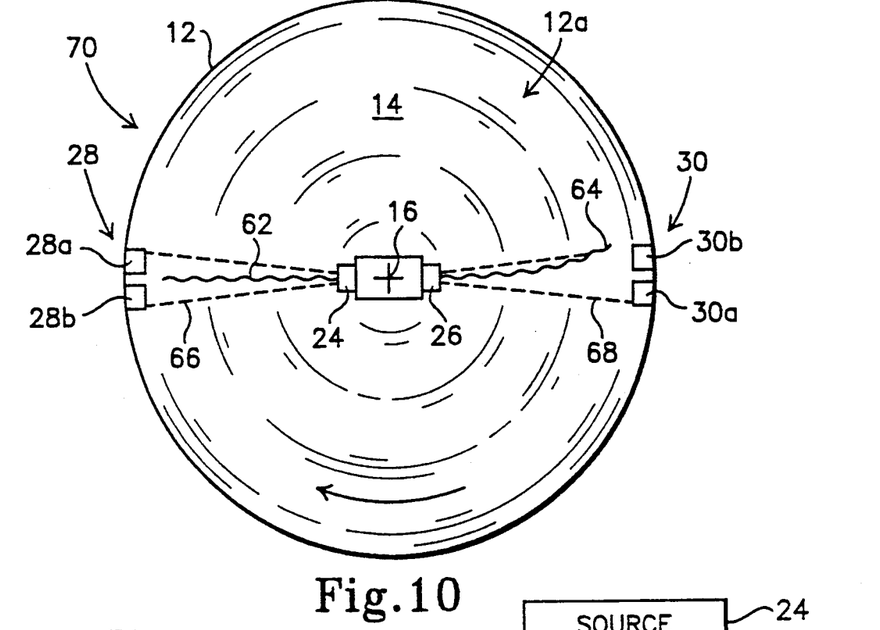

A modified sensor 70 is illustrated in FIG. 10 which is similar in construction and operation to the sensor 60, except that the curtains 62 and 64 are fixedly supported at their radially inner edges adjacent to the centers of the light sources 24 and 26 respectively. The curtains may also be supported at an upper or lower edge, with the light sources and photosensors aligned vertically relative to the curtains.

The sensors 60 and 70 may be utilized in combination with the circuitry illustrated in FIG. 8. The operation will be equivalent, except that the relative polarities of the electrical signals will be reversed from those previously described.

The resilient members, whether they be optical fibers for transmitting light or opaque members for blocking light, are preferably made relatively stiff to resist radial motions caused by vibration. In addition, the response of the resilient members to undesired linear acceleration may be reduced by making the density of the fluid as close as possible to that of the resilient members. This results in the resilient members being completely entrained in the fluid. Glycerol, for example, has a higher density than water, and provides a closer density match with glass optical fibers. The sensitivity of a sensor utilizing glycerol was found to be much higher than that of a sensor utilizing water. However, the low frequency response of the glycerol sensor was non-linear due to its high viscosity. Thus, lower viscosity fluids such as water and/or alcohol would appear to be desirable for automotive applications where relatively low rotation rates are required to be accurately measured. Another method of matching the density of the resilient members to that of the fluid is to make the resilient members of a porous material such as stiff woven cloth, such that a significant proportion of the volume of the resilient members is occupied by the fluid.

Figures 11, 12:
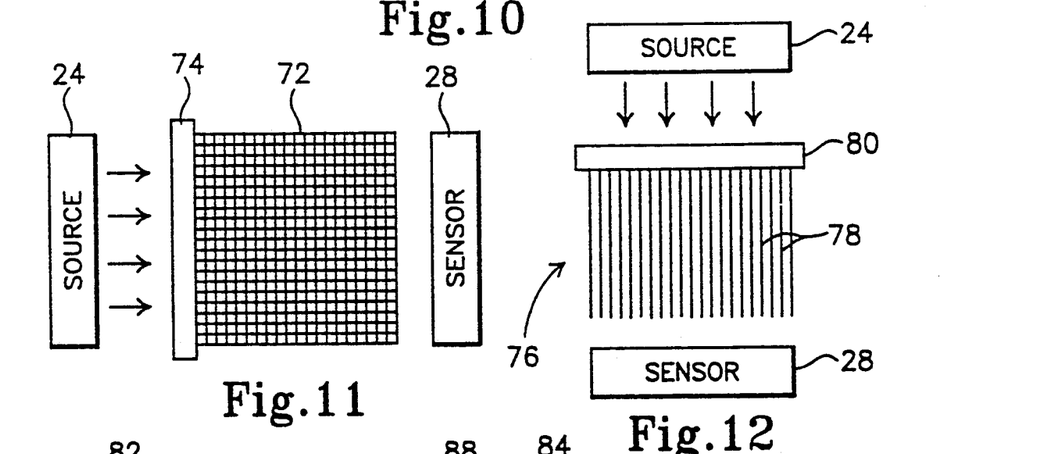
FIG. 11 is a side elevational view illustrating a modified curtain in the form of a net.
FIG. 12 is a side elevational view illustrating a plurality of parallel optical fibers which may replace the curtains in the embodiments of FIGS. 9 and 10.

FIG. 11 illustrates a modified curtain 72 which is applicable to either of the embodiments of FIGS. 9 and 10. The curtain 72 is provided in the form of an open net, enabling the fluid to fill the openings or perforations in the net structure, and enhance the entrainment of the curtain 72 in the fluid. Further illustrated is a clamp 74 for fixedly supporting the left edge of the curtain 72 relative to the light source 24.

FIG. 12 illustrates another resilient light blocking member 76 which may replace a light blocking curtain in the above described embodiments of the invention. The member 76 includes a plurality of fibers 78 which extend parallel to each other and are fixedly supported at their upper ends adjacent to the light source 24 by a clamp 80. The fibers 78 are at least partially opaque so as to be capable of reducing the amount of light incident on the photosensor 28.

Figure 13:
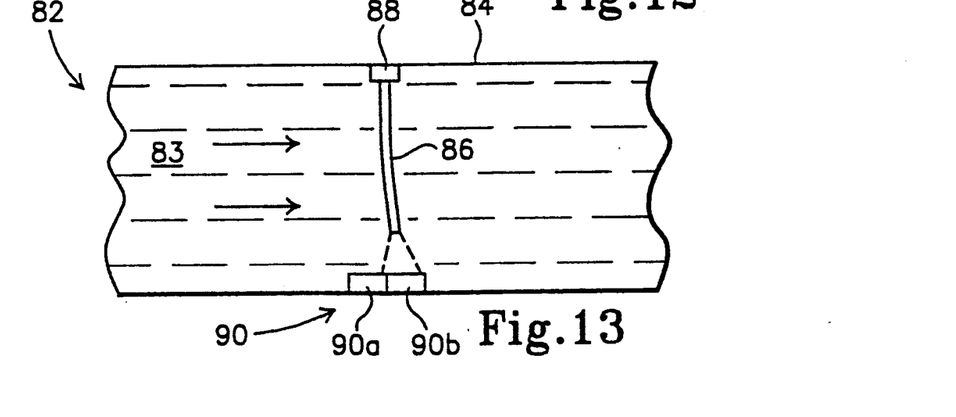
FIGS. 13 and 14 are simplified vertical sectional views illustrating sensors embodying the present invention adapted to measure fluid flow rate.
Figure 14:
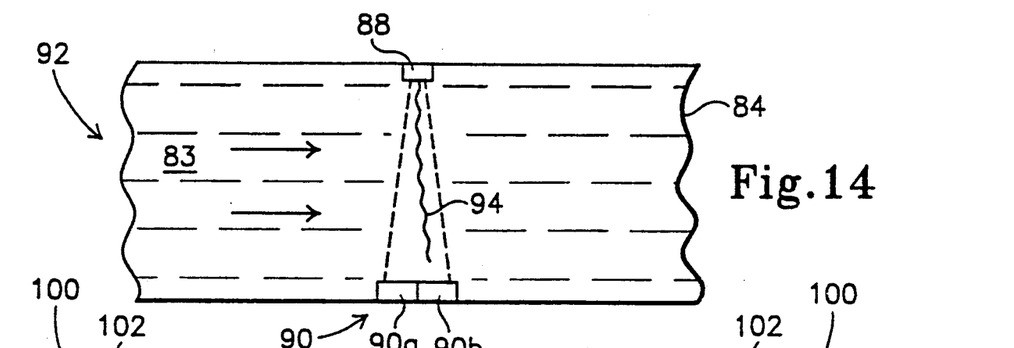

The present invention is further capable of detecting fluid motion relative to a fixed sensor arrangement. As illustrated in FIG. 13, a flow rate sensor 82 includes a passageway such as a conduit 84 through which a fluid 83 is directed to flow. An optical fiber 86 is fixed at its upper end to a light source 88. The lower end of the fiber 86 is deflectably movable relative to a photosensor 90 including elements 90a and 90b which are spaced from each other along the direction of fluid flow. Fluid 83 flowing from left to right will cause the optical fiber 86 to deflect rightwardly such that more light will be incident on the element 90b than on the element 90a, and vice-versa. FIG. 14 illustrates a similar sensor 92 in which the optical fiber 86 is replaced by a curtain 94. In the embodiments of FIGS. 13 and 14, the deflection of the resilient member by the fluid 83 and thereby the output signal from the photosensor 90 will vary in accordance with the flow rate of the fluid.

Figure 15:
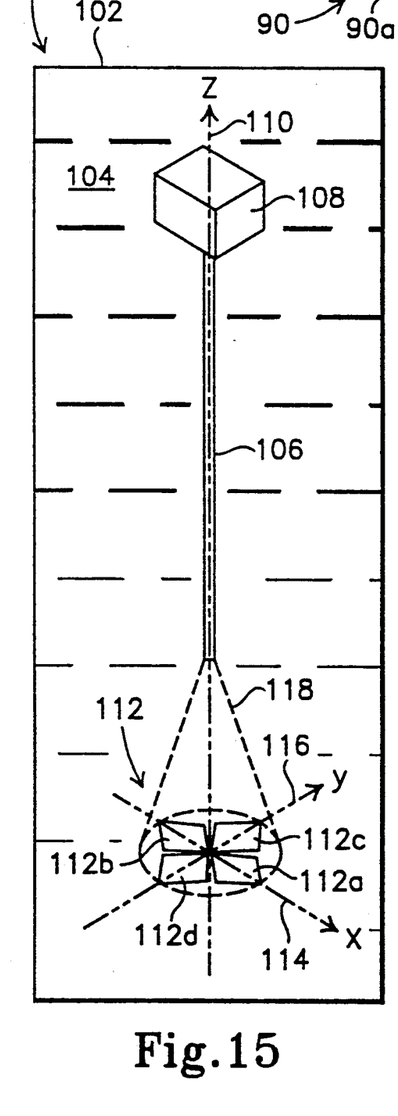
FIGS. 15 and 16 are simplified isometric views illustrating a sensor embodying the present invention adapted to measure linear motion in two dimensions.
Figure 16:
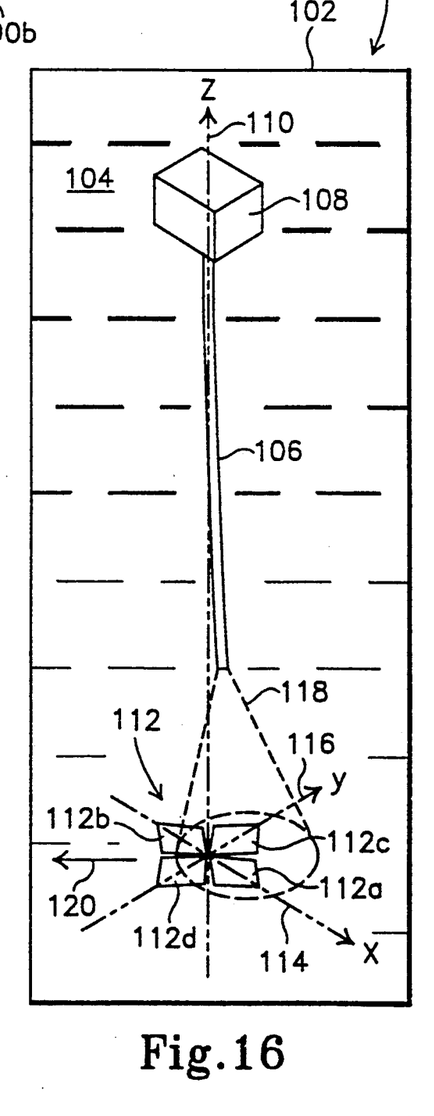

FIGS. 15 and 16 illustrate a linear motion sensor 100 embodying the present invention which is capable of detecting linear acceleration along two orthogonal axes. The sensor 100 includes a container 102 filled with a fluid 104. An optical fiber 106 is fixedly supported at its upper end adjacent to a light source 108, and extends along a vertical or Z-axis 110 when the container 102 and fluid 104 are stationary. A photosensor 112 is disposed below the lower, deflectable end of the fiber 106 with its center aligned with the axis 110. The photosensor 112 includes first and second elements 112a and 112b which are equally spaced on opposite sides of the Z-axis 110 along an X-axis 114 which is perpendicular to the Z-axis 110, and third and fourth elements 112c and 112d which are equally spaced on the opposite sides of the Z-axis along a Y-axis 116 which is perpendicular to the axes 110 and 114.

As illustrated in FIG. 15, the container 102 and fluid 104 are stationary, and the photosensor elements 112a, 112b, 112c and 112d are equally illuminated by a cone of light 118 emitted from the lower end of the optical fiber 106 and produce equal electrical output signals. In FIG. 16, the container 102 is accelerated leftwardly as viewed in the drawing and indicated by an arrow 120. This causes relative deflection of the optical fiber 106 in the opposite, or rightward direction due to buoyant forces which arise when the fiber density differs from the fluid density. This deflection has components in the directions of both the X- and Y-axes 114 and 116 respectively. As a result, the element 112a will have a larger amount of light incident thereon and produce a higher output signal than the element 112b. In addition, the element 112c will have a larger amount of light incident thereon and produce a higher output signal than the element 112d. The logical sense and magnitude of the output signals of the elements 112a, 112b, 112c and 112d correspond to the linear direction and magnitude of acceleration respectively of the container 102.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A sensor comprising:
   light source means;
   photosensor means for receiving light emitted by the light source means;
   fluid passageway means;
   resilient member means at least partially immersed and completely entrained in a fluid in the passageway means; and
   support means for supporting the resilient member means in the passageway means such that the resilient member means varies the amount of light propagating from the light source means to the photosensor means as a predetermined function of the amount of movement of the fluid and resulting deflection of the resilient member means along the direction of movement of the fluid in the passageway means.

2. A sensor as in claim 1, in which:
   the resilient member means comprises a resilient optical fiber having a first end which is fixedly supported by the support means for receiving the light emitted by the light source means, and a second end which is deflectably movable adjacent to the photosensor means for transmitting the light from the light source means toward the photosensor means; and
   the amount of light incident on the photosensor means from the second end of the optical fiber varies in accordance with the deflection thereof.

3. A sensor as in claim 2, in which:
   the passageway means comprises a container which is filled with the fluid and has an axis which extends substantially perpendicular to said direction of movement of the fluid; and
   the optical fiber extends substantially along said axis when the container and fluid are stationary.

4. A sensor as in claim 2, in which:
   the passageway means comprises a container which is filled with the fluid and has a rotation axis; and
   the optical fiber extends substantially parallel to and offset from said axis when the container and fluid are stationary.

5. A sensor as in claim 2, in which:
   the passageway means comprises a container which is filled with the fluid and has a rotation axis; and the optical fiber extends substantially perpendicular to said axis when the container and fluid are stationary.

6. A sensor as in claim 5, in which the light source means and first end of the optical fiber are spaced between said axis; and the photosensor means and second end of the optical fiber.

7. A sensor as in claim 1, in which the resilient member means is disposed so as to block propagation of light from the light source means to the photosensor means to an extent which varies in accordance with the deflection of the resilient member means.

8. A sensor as in claim 7, in which the resilient member means comprises a resilient curtain which is fixedly supported at an edge thereof.

9. A sensor as in claim 8, in which the curtain is made of a porous material.

10. A sensor as in claim 8, in which the curtain is formed with perforations therethrough.

11. A sensor as in claim 7, in which the resilient member means comprises a plurality of resilient fibers which extend substantially parallel to each other and are each fixedly supported at one end thereof.

12. A sensor as in claim 1, in which the resilient member means has substantially the same density as the fluid.

13. A sensor as in claim 1, in which:
the passageway means has an axis which extends substantially perpendicular to said direction of movement of the fluid;
the resilient member means extends substantially parallel to said axis and lies in a plane which extends substantially parallel to said axis when the passageway means and fluid are stationary;
the photosensor means comprises first and second photosensor elements disposed on opposite sides of the plane; and
the resilient member means is deflectable substantially perpendicular to the plane by movement of the fluid.

14. A sensor as in claim 13, in which the first and second photosensor elements are connected in circuit to produce a difference signal output.

15. A sensor as in claim 1, in which:
the passageway means comprises a container which is filled with the fluid; and
the fluid comprises glycerol.

16. A sensor as in claim 1, in which:
the passageway means comprises a container which is filled with the fluid; and
the fluid comprises water.

17. A sensor as in claim 1, in which:
the passageway means comprises a container which is filled with the fluid; and
the fluid comprises a mixture of alcohol and water.

18. A sensor as in claim 1, in which:
the resilient member means comprises at least one resilient optical fiber, each having a first end which is fixedly supported by the support means for receiving the light emitted by the light source means, and a second end which is deflectably movable adjacent to the photosensor means for transmitting the light from the light source means toward the photosensor means; and
the amount of light incident on the photosensor means from the second end of each optical fiber varies in accordance with the deflection thereof.

19. A rotation sensor, comprising:
a container which is filled with a fluid and has a rotation axis;
first and second resilient optical fibers which are at least partially immersed in the fluid in the container, and extend radially from and substantially perpendicular to and on opposite sides of said axis when the container and fluid are stationary, the first and second optical fibers being fixedly supported at radially inner ends thereof;
light source means for emitting light into the radially inner ends of the first and second optical fibers respectively; and
first and second photosensors for receiving light emitted from radially outer ends of the first and second optical fibers respectively;
the amount of light incident on the first and second photosensors from the outer ends of the first and second optical fibers varying as a predetermined function of the rotation of the container about said axis, and the resulting relative movement of the fluid and deflection of the first and second optical fibers in the container.

20. A sensor as in claim 19, in which each of the first and second photosensors comprises first and second photosensor elements which are disposed on opposite sides of the first and second optical fibers respectively in a direction of rotation about said axis when the container and fluid are stationary.

21. A sensor as in claim 20, in which:
the first and second photosensor elements of the first photosensor are connected in circuit to produce a first difference signal output; and
the first and second photosensor elements of the second photosensor are connected in circuit to produce a second difference signal output.

22. A sensor as in claim 21, further comprising computing means for producing an electrical signal corresponding to the sum of the first and second difference signal outputs.

23. A sensor as in claim 22, further comprising computing means for producing an electrical signal corresponding to the difference between the first and second difference signal outputs.

24. A sensor as in claim 19, in which the container has a substantially torroidal shape.

25. A sensor as in claim 1, in which:
the passageway means comprises a container which is filled with a fluid and has a rotation axis;
the resilient member means comprises first and second resilient members which are disposed on opposite sides of said axis, extend parallel to said axis and lie in a plane which is parallel to said axis when the container and fluid are stationary;
the light source means comprises first and second light sources for illuminating first edges of the first and second resilient members respectively; and
the photosensor means comprises first and second photosensors disposed adjacent to second edges of the first and second resilient members which are opposite to the first edges thereof respectively;
the first and second resilient members blocking propagation of light from the first and second light sources to the first and second photosensors to an extent which varies in accordance with the deflection of the first and second resilient members in the container.

26. A sensor as in claim 25, in which each of the first and second photosensors comprises first and second photosensor elements which are disposed on opposite sides of said plane.

27. A sensor as in claim 26, in which:
the first and second photosensor elements of the first photosensor are connected in circuit to produce a first difference signal output; and
the first and second photosensor elements of the second photosensor are connected in circuit to produce a second difference signal output.

28. A sensor as in claim 27, further comprising computing means for producing an electrical signal corresponding to the sum of the first and second difference signal outputs.

29. A sensor as in claim 27, further comprising computing means for producing an electrical signal corresponding to the difference between the first and second difference signal outputs.

30. A sensor as in claim 25, in which the first and second resilient members comprise resilient curtains which are fixedly supported at edges thereof respectively.

31. A sensor as in claim 3, in which the photosensor means comprises:
first and second photosensor elements which are disposed on opposite sides of said axis in a first direction which is perpendicular to said axis; and
third and fourth photosensor elements which are disposed on opposite sides of said axis in a second direction which is perpendicularl to the first direction.

* * * * *